(12) United States Patent
Takahashi

(10) Patent No.: US 8,759,408 B2
(45) Date of Patent: Jun. 24, 2014

(54) TIRE VULCANIZATION/RETREADING SYSTEM USING AUTOCLAVE WITH ELECTROMAGNETIC INDUCTION HEATING

(76) Inventor: Julia Takahashi, Dracena (BR)

( * ) Notice: Subject to any disclaimer, the term of this patent is extended or adjusted under 35 U.S.C. 154(b) by 232 days.

(21) Appl. No.: 13/257,444

(22) PCT Filed: Oct. 7, 2009

(86) PCT No.: PCT/BR2009/000334
§ 371 (c)(1),
(2), (4) Date: Dec. 6, 2011

(87) PCT Pub. No.: WO2010/105316
PCT Pub. Date: Sep. 23, 2010

(65) Prior Publication Data
US 2012/0065281 A1 Mar. 15, 2012

(30) Foreign Application Priority Data
Mar. 18, 2009 (BR) ...................... 0900803

(51) Int. Cl.
*C08J 11/04* (2006.01)

(52) U.S. Cl.
USPC ............ 521/41; 521/40; 521/40.5; 521/45.5; 425/28.1; 425/40; 425/41; 152/1; 152/151; 152/198; 152/205

(58) Field of Classification Search
USPC ........ 521/40, 40.5, 41, 45.5; 152/1, 151, 198, 152/205; 425/28.1, 40, 41
See application file for complete search history.

(56) References Cited

U.S. PATENT DOCUMENTS 2,094,511 A * 9/1937 Welch ............................ 425/20

FOREIGN PATENT DOCUMENTS

GB          448204      *   6/1936

* cited by examiner

*Primary Examiner* — Frances Tischler
(74) *Attorney, Agent, or Firm* — Scully, Scott, Murphy & Presser, P.C.

(57) ABSTRACT

Tire vulcanizing/retreading and de-vulcanization system including an autoclave and heating based on an induction system, which will lead to vulcanization or de-vulcanization of a tire.

10 Claims, 5 Drawing Sheets

TIRE VULCANIZATION/RETREADING SYSTEM USING AUTOCLAVE WITH ELECTROMAGNETIC INDUCTION HEATING

FIELD OF THE INVENTION

The present invention in the field of tire and tire retreading industry using vulcanizing process of elastomeric material.

BACKGROUND OF THE INVENTION

The tire construction concept, radial tires have a complex structure, as seen in FIG. 1, which includes the following key components:

Tread (P1): area where the tire touches the ground; Shoulder (P2): Transition area from the tread to the tire sidewalls; Sidewalls (P3): area that supports the tire structure; Bead (P4): area of contact and fixation of the tire with the wheel for assembly; Casing ply (P5): the steel or textile structure that conforms the tire. In radial tires it is 100% metal or mixed, textile with metal, with differentiated construction of the diagonal tire, which usually has a textile structure and ply angle and different formatting; Work plies (P6): these are the tread plies and their function is to conform, structure and move the tire; Guard plies (P7), and the purpose of these plies is to protect the tread structure; and Inner casing area (P8): area where air or the air tube is housed in tubeless tires.

The vulcanization concept: invented in 1839 by Charles Goodyear, an American inventor, vulcanization generally consists of applying heat and pressure to a rubber composition to give it the shape and properties of the final product. Rubber is heated in the presence of sulfur and accelerating and activating agents to form cross links in the individual polymer molecules, which account for the development of a three-dimensional rigid structure with resistance proportional to the amount of such links. It must be pointed out that there is also a process of cold vulcanization.

The tire retreading concept: this process reutilizes used tires. The key vulcanization areas are determined as shown in FIG. 2: Area (A1): Connecting rubber on the new tread applied. This is the rubber to be vulcanized to link the casing to the new materials applied to the tread area; Area (A2): repair and buffing area where filling rubber will be applied to fill it, and also patches for inner reinforcement; Area (A3): connecting rubber on the patches. This is the rubber to be vulcanized to link the inner structure of the casing to the patch that reinforces damaged areas; Area (A4): Rubber with several compounds subject to vulcanization in several areas of the tire as a means to repair or to actually retread the tire.

The retreading process: vulcanization is applied to add rubber to a "used tire" so it can be reused. In cargo loading, machines and agricultural fields, the casing structure corresponds to a range of up to 82% of the casing structure, meaning that lack of reutilization is a major waste. The "prepared tire" represents the final product prepared to be vulcanized. A new "tread" is applied to this tire (alternatively the tire can be prepared for partial repairs in parts of its structure that got damaged when the tire was running) To retread the tire, the following sequence of steps is followed as defined in the block diagram shown in FIG. 3, describing the steps:

Tire preparation stage (1): also called "envelope". This is the application of a rubber envelope covering the entire outer area of the tire. The end is sealed by the tire bead or by the wheel or by the sidewall, depending on the length of the wheel flange. If it is long, it will require using an envelope rim. If it is short, it will be shaped as a flange covering part of the sidewalls and requires a shorter length for covering and sealing. In the market it is called a flanged envelope.

The purpose of applying an envelope is to insulate the used tire from the inner atmosphere of the autoclaving equipment. The envelope has a nozzle that provides connection to a hose inside the autoclave.

The types of envelope used: 1) Flanged envelope and bead: they differ basically in flange length. When it is long, it can be used in sealing rim assemblies or else with short-flanged wheels; and 2) Conjugated envelope or "innerlop": This type does not require assembly with rims or wheels. Sealing is made with a rubber element that coats the inner part of the tire and replaces the air tube. It is differentiated by the fact that the conjugate has only one point of sealing and the innerlop is sealed in both sidewalls of the tire.

The connection of the envelope nozzle to the autoclave inner hose keeps the tire atmosphere under control of the autoclave external pressure. Therefore, when the autoclave internal atmosphere is pressurized, it causes a negative pressure differential thus causing the outer atmosphere to which the tire is connected to always have a smaller pressure than the autoclave inner atmosphere. The main consequence is the fact that, as this envelope is made of an extremely flexible rubber, the pressure differential forces out the air between the envelope and the tire. This causes the envelope to exert compression on the whole periphery of the tire, which makes it possible for the new tread or any other rubber to be vulcanized to get suitable pressure so that the parts unite.

Usually the level of negative pressure contained within the tire envelope can be controlled by injecting air through the hose contacting the atmosphere, and the application of compressed air can control the level of mechanical pressure made by the envelope on the tire.

Tire/wheel assembly stage_(2): used in a system called "double pressure". In this case, an "air bag" component is used. This is a reinforced air tube designed to deliver resistance at high pressure and temperature. It forces the compressed air inside it to exert pressure on the sides and the tire bead against the wheel, causing sealing of the envelope with the autoclave inner atmosphere. To get this effect, the air bag pressure must be higher at all times to get the differential that will keep envelope sealing on the tire. A protective component is also projected. This is a rubber element assembled between the wheel and the air bag.

The wheel is a metal element assembled between the tire beads designed to keep the air bag inside the tire, compressed by the pressure applied inside it and to work as sealing of the edges of the vulcanization envelope;

Finally, when the tire is assembled on the wheel, a "sealing rim" element is assembled. This is a metal element assembled individually on each of the beads to replace the function exerted by the wheel to seal the outer surface of the tire wrapped by the vulcanization envelope, thus dismissing the need for an air tube and the rubber guard used between the wheel and the tube.

Stage of vulcanization in autoclave_(3): the prepared tire is introduced inside the autoclave where it is exposed to special conditions of pressure, temperature and vulcanization time.

Autoclave unloading stage_(4).

Tire dismounting stage_(5).

Tire cooling stage_(6).

The basic parameters of the autoclave vulcanization stage: to get successful tire vulcanization, the basic variables involved in the process are:

Vulcanization pressure: the pressure exerted on the compounds subjected to vulcanization is a key element to join the two surfaces considering the structure of the material and the conditions of use of the tire which require a strong link between the tire surface and the new rubber to be vulcanized.

Normally, the action of pressure on the rubber compound to be vulcanized in the autoclave is made by the compressed air inside the autoclave which works on the tire via pressure differential exerted by the application of the sealed envelope on the tire which can be assembled with an air bag or by sealing rims.

A1. Pressure parameter in the single pressure system: also known as "disassembled". We find a pressure differential only between the envelope and the tire. Therefore, what determines the compression of materials is the compressed air inside the autoclave and the pressure differential resulting form the connection of the envelope with the autoclave outer atmosphere. The following is considered as pressurization parameters of the autoclave: 4-6 kg/cm2. The differential pressure between the autoclave inner atmosphere and the inside of the envelope is usually given by the pressure inside the autoclave, which can be reduced during the process via injection of compressed air, to keep the same differential existing between the autoclave and the air bag, considering that equalizing the two pressures would cause loss of compression of the envelope on the tire and would damage adhesion of the two materials.

A2. Pressure parameter in double and triple pressure systems: for pressurization systems where the air bag is subjected to the action of two inflating pressures, the first one due to the need to keep the envelope tightly sealed in the bead edge and to preserve the structural conformation of the tire, this must be the higher pressure of the process. The other is the pressure inside the autoclave which compresses the envelope against the tire in function of the atmosphere between the tire and the envelope. It is linked to the autoclave outer atmosphere causing a negative pressure differential between the inside of the machine and the outer atmosphere connected by the hose which is connected to the ambient pressure. Pressures normally ranging from 4-6 kg/cm2 are considered as autoclave pressure parameters. The recommended pressure differential between the autoclave and the tire air bag is in the 1.5-3.0 kg/cm2 range.

B. Vulcanization temperature parameter: Applying temperature (or a temperature range) correctly is critical to take rubber to a state in which elastic properties are delivered, reset or improved. In the tire retreading field, there is a range of materials used in several parts of a tire and there is also a variety of formulations suitable to different tire applications and uses made by end users. In the area of retreading, vulcanization temperatures in the 100° C.-150° C. were set as vulcanization temperature parameters where practically all the range of commercially used materials are submitted to vulcanization.

C. Vulcanization times in the autoclave vulcanizing process:

C1. Autoclave pre-heating time: comprises the time the equipment takes to go from ambient temperature to reach the pre-determined vulcanization temperature. This does not mean that the tire follows this temperature; it only refers to the temperature reading inside the equipment. This time varies considerably according to installation conditions of the equipment, ambient temperature, equipment model, heat exchange systems, etc. The acceptable time in the retreading process is 15-45 minutes.

C2. Vulcanization time: comprises the time between the end of the pre-heating time with temperature stabilized in the operating limits and the time required for all tire areas to get vulcanized. In the area of cargo load tires, depending on the assembly methods, times vary between 105 to 180 minutes. During this time, these are the vulcanization phases:

1. Preliminary phase, set by the time when vulcanization is not yet taking place. During this time rubber behaves thermoplastically and reduces viscosity due to the combined effect of heating and macromolecular splitting. Depending on the choice of the vulcanization system, the start of vulcanization can be quick or slow. In molding processes, it is necessary to keep the compound flow until all tire cavities are filled and air is allowed to escape. Vulcanization starting too quickly is not recommended in most cases because it interferes with the process safety. It may ultimately sometimes cause vulcanization to start before the mold or tire cavities are completely filled.

2. Sub-curing phase, when the reticulation process takes place. At this time most rubber properties are not yet fully developed.

3. Optimal curing phase, with maximum degree of reticulation. As not all properties of vulcanized products reach their optimal value at this curing level, it is necessary to find a balance between the cure stage and a slight over-cure.

4. Over-cure phase, characterized by prolonged heating (vulcanization) of rubbers beyond the optimal curing time.

The heat generating equipment in the tire vulcanization process:

1. Boiler: This is a metal container designed to generate steam by heating water. Direct steam is normally used in equipment such as autoclaves where steam is directly injected in the vulcanization chamber under pressure and the steam gets in direct contact with the rubber to be vulcanized.

Indirect steam is used in structures with different shapes. The commonest ones are: copper, iron or steel coils that circulate steam and transmit heat to the surface and transfer it to environment directly in the case of autoclaves that heat the mold in which it is cast in its body or forming a wrapping around the mold to be heated.

2. Vulcanization chamber: is placed around the vulcanization mold, where steam circulates and heats it.

3. Electrical resistance system.

4. Autoclave: metal container where pressure and temperature are applied for a predetermined time to vulcanize "prepared tires". The key components of the autoclave are:

Ventilation system: includes a motor, propellers and air conductors along the autoclave inner wall, designed to make convection of heated air and keep air temperature homogeneous in all vulcanization points.

Autoclave inflating system: the purpose is to keep and control compressed air inside the vulcanization chamber.

Air bag inflating system: system including internal piping and hose used to keep and control compressed air in tires when tires are assembled with air bags.

Envelope inflating system: Internal piping and hose system connected to tire envelopes, designed to keep and control pressure exerted by the envelopes on the tire by the pressure differential between the autoclave pressurized atmosphere and the ambient atmosphere. Via controlled injection of compressed air, it is possible to adjust the strength of the compression exerted on the tire and reduce it.

Vacuum system of envelopes: Piping system joint or parallel to the envelope inflating system, designed to keep or control vacuum pumping in envelopes thus making it possible to remove more air from envelopes. Consequently, the compression force is increased on the tire, or drastic reduction of the compression force is reduced in case of accidental punctures in the envelope.

Heating system: these components are designed to vulcanize tires. Several methods may be used: direct or indirect steam, electricity, thermal fluid.

Process control systems: electric or electronic panels that control all time pressure and temperature variables of the vulcanization process. Some record events to be checked later.

Autoclave pressurizing systems:

1. Single-pressure system: developed with tire assembly only with envelopes called "innerlop" or conjugated envelopes or assembly with vulcanization rims. This system uses only differential pressure between the autoclave inner atmosphere and the atmospheric pressure of the environment. Its use is limited to steel radial tires because bias ply tires or tires textile plies such as nylon, rayon or polyester require assembly with wheels and application of inner pressure so as not to damage tire shape, structure or conformation with the application of temperature on tire components.

2. Double pressure system: developed through wheel assembly, air bag, protector and wheel, which provides application of pressure to the air bag, thus creating a differential atmosphere between the tire and the autoclave inner atmosphere. The purpose of greater pressure in the air bag is to seal the envelope and also to keep the original structure, shape and conformation of the product in case of tires with textile plies such as nylon, rayon or polyester, which are sensitive to increases in temperature.

3. Third pressure system: similar to the double pressure system. The difference is the fact that there is a compressed air injection control system. The compressed air returns through the envelope piping and this keeps the differential pressure between this and the autoclave atmosphere. The purpose is to promote variation in differential pressure and reduce it to diminish wear caused by the envelope conformation pressure on the tread design, causing thinning of the envelope wall and tear or puncture, deformation and stretching.

Critical analysis of the autoclave tire vulcanization process: although the current process performs its primary function of delivering tire vulcanization, particularly in tire retreading, a detailed study of this process allows us to note a series of restrictive aspects, both from the viewpoint of the process itself and from the viewpoint of the final product obtained.

The level of complexity required by the installation before getting to the actual operation involved in tire vulcanization and in retreading by vulcanization is relatively high, and variable in errors and decisions involved are often higher than the technical capacity of the final user involved, particularly in the retreading sector with unskilled labor. Even in relatively large companies, the levels of success, efficiency and sustainability are quite low. We can see that the cost variable is impacted by several factors, such as:

a) Boiler efficiency, as determined by the following parameters:
   a1. Temperature of gases (chimney temperature);
   a2. Fuel specifications;
   a3. Excess air;
   a4. Ambient air temperature;
   a5. Losses by radiation and convection;
b) Losses in steam piping;
   b1.) Improper layout;
   b2.) Wrong sizing of pipes;
   b3.) Qualification of materials;
   b.4) Insufficient insulation;
   b.6) Lack of maintenance in piping;
   b.7) Improper operation;
c) Losses associated to tire vulcanization equipment:
   c.1) Poorly sized installation;
   c.2) Deficient or unsuitable insulation;
   c.3) Poor quality accessories such as valves, controllers, etc.;
   c.4) Wrong sizing of equipment;
   c.5) Lack of maintenance;
   c.6) Improper operation.

Consolidation of the critical analysis of the conventional vulcanization process: an analysis of the aspects that compromise vulcanization effectiveness allows us to state that, among the countless aspects listed, waste of energy is of great relevance.

Energy consumption is always high since in order to transfer heat by means of the aforementioned methods, the heating elements invariably operate at a very high temperature so heat exchanges can take place between the bodies within a desirable time length.

Currently all autoclave heating systems available in the market work with the convection and conduction principle, in which heat exchange between tire components occurs. To do so, transformations and changes in state of the materials involved are required. This causes great losses in efficiency because of the machines, labor, process, materials, the environment, etc. Convection heat exchange is really an expensive process due to the difficulties to control energy waste.

From the viewpoint of the tire physical structure, using vulcanization by convection and conduction is extremely slow. The pre-molded material, duly applied on the tread, undergoes slower vulcanization, since vulcanization takes place by irradiation of the outer surface of the tire and of the pre-molded, the thickness of which varies between 12 and 25 mm, thus forcing heat to penetrate this poor heat-conducting material. This slows down vulcanization and causes great inaccuracy. This traditional concept requires long heating time, i.e., above 180 minutes (3 hours) and, as a consequence, it causes low productivity in retreading.

SUMMARY OF THE INVENTION

This invention is an evolution of the tire vulcanizing process. This invention is different from everything known in the state of the art, since it includes the autoclave vulcanizing stage made by heating based on a novel induction system which will lead to vulcanization of a tire prepared for retreading.

Through this principle, the new vulcanizing stage is particularly useful for vulcanizing radial tires. However its positive, differentiated results are also observed on other types of tires.

By using this unprecedented concept of vulcanization by induction technology, value is added to the emerging activity of tire retreading, since a clear improvement in productivity in vulcanization is obtained without compromising quality of the final tire product. With the new induction vulcanizing stage, it is possible to prevent surface oxidation of metal components which form the physical structure of the tire and also prevent or minimize possible tire deformation at the end of the process.

Still under the point of view of the vulcanizing process, the autoclave vulcanizing stage with induction heating is characterized by delivering perfect temperature control inside the autoclave.

Finally, the new process claimed herein is characterized by being an ecologically correct solution since it is a clean technology that does not discard residual material from the tire vulcanizing process.

Based on the fundamentals of the technique, the it was a latent need for improvement in the autoclave tire vulcanization system. The development of this improvement should be particularly based on: a. Optimized autoclave heating system; b. Optimized vulcanization cycle time for retreading tires; and c. Insurance and improvement of final quality of retreated tires.

The novel autoclave vulcanization stage with induction heating system, particularly for metal radial tire retreading, is characterized by vulcanization of pre-molded material applied to the tire tread.

For a consolidated understanding of the differentiated results obtained in vulcanization and retreading of tires processed in autoclave by induction system, the an ample description of the concept of electric conductivity involved in tire components is provided.

On the concept of electric conductivity: It is used to specify the electric character of a material. It is simply the reciprocal of resistivity, i.e., inversely proportional and it is indicative of how easily a material can conduct an electric current. The unit is the reciprocal ohm-meter, i.e., $[(\Omega\text{-m})-1]$.

On electric conductivity of materials: Solid materials display a vast range of conductivities, rated in different groups according to how easily they conduct an electric current, i.e.: conductive materials, semi-conductive materials and insulating materials. Electric conductivity of materials is based on the fact that the last electronic layer of the elements is unstable, i.e., the electrons in the valence layer easily displace between neighboring atoms.

On electric properties of metals: the last electronic layer of some materials like copper and iron is unstable, i.e., this last layer can easily lose electrons. These free electrons wander from atom to atom with no definite direction. As electrons do not have a defined direction, the atom that has lost electrons gets electrons back easily from neighboring atoms. As they lose electrons very easily, these metals are widely used to manufacture electric and electro-electronic conductive wires. Loss of electrons allows us to state that metals have a good flow of electrons inside them.

On the electric properties of rubber: these may have a wide variety of electric properties, including electrical and magnetic properties. When rubber composition is suitable, it can be highly conductive or completely insulating. Rubbers do now allow electrons to go through. Rubber atoms have difficulty to yield or to receive electrons in their valence layer. To promote electric conductivity in rubbers, different materials such as metal particles, intrinsic conductive polymers (PCI) and soot have been added to formulations of materials in order to provide electric properties to rubbers.

In rubber compounds with soot, the soot particles tend to form conductive trails in the insulating matrix, which depend on the amount of load used. At low concentrations of soot, resistivity of compositions is essentially that of the insulating medium. With the increase in the load of soot, a critical concentration value is attained, and from this level on resistivity starts to decrease quickly. This is called percolation composition because of the formation of a conductive path inside the insulating matrix.

On the concept of magnetic induction: this phenomenon starts production of an electromotor force (f.e.m. or voltage) in a medium or body exposed to a static magnetic field. This is how an induced current is produced when the body is conductive. This phenomenon was discovered by Michael Faraday, who expressed it by indicating that the magnitude of the induced current is proportional to the variation of the magnetic flow (Faraday's Law). On the other hand, Heinrich Lenz proved that the induced current due to electromotor force opposes to the change in magnetic flow, so that the current tends to keep the flow. This is valid both for the case in which the flow intensity varies, or the conductive body moves in relation to the flow.

On the concept of electromagnetic induction: this is the fundamental principle on which transformers, generators, motors and most electric machines work. Conceptually, a "magnetic field" is created by means of a current induced by a magnet in a circular spire. For this to take place, we use a moving magnet (in relation to the spires) to force to vary the magnetic flow of the induction lines that cross the spire surface. When the magnet is moving, the magnetic flow leaving the north pole of the magnet gets to the spire with more or less intensity and if the magnet is stopped, the flow is constant. When a pole gets close to the spire, the direction of the electric current is in a particular direction and when the same pole gets father, the direction of the current inverts.

The magnetic induction system causes heating from an electric current that generates a magnetic field actuated by the presence of a metal body placed under its base, where vibration of molecules generate heat.

Normally, induction heating is obtained when a current crosses a metal coil generally made of copper. The passing of the current through these coils creates a magnetic field which envelops the metal and produces an electric current within the material, and this generates heat.

It must be added that induced currents are produced not only in conductive wires, but also in any moving massive conductor in a magnetic field or else crossed by a variable magnetic flow. Within a conductive material we can find several closed loops for circulation of a current. In each loop the magnetic flow varies with time; therefore induced tensions make induced currents circulate inside the massive conductive material.

In conventional induction heating, all the three ways to transfer heat (conduction, convection and radiation) are present. Heat transfers by convection and radiation reflect the values of heat loss.

On the concept of Foucault currents: Also called "parasite currents". They are defined as currents that circulate in metal cores subject to a variable magnetic field. They are shaped like small concentric circles, and in each point inside the core the current is null, since the effect of a current is annulled by another. However, this does not happen in the periphery, where the currents, all in the same direction, add up and circulate around the periphery of the core. This causes the core to heat up via Joule effect, which requires additional energy from the source. These currents may reach very high values and heat the material. Where this heating is undesirable, there occurs the phenomenon called "Foucault losses".

Taking into consideration losses in function of frequency, knowing how to choose the correct frequency for the application, items of equipment suitable to the materials that the company desires to treat thermally are conceived.

Tension inverters are converters designed to control the flow of electric power between a source of continuous tension and a load in alternate current, either single- or multi-phase, with effective control of heat levels of tension and frequency. Depending on the application, inductive heating is currently one of the commonest applications for this type of technology.

On tire retreading by autoclave heating with induction heating system: this process is based on the principle that conductive materials, metal and rubber, may be heated by heat induction in steel plies or in rubber depending on the constructive and structural characteristics of the tire and depending on the level of conductivity and materials used in its manufacturing.

First condition: in radial tires. As their structure includes steel wires, they can easily get induction in their structure or in their rubber components.

Second condition: in radial or diagonal tires because their plies are built with nylon, rayon or polyester. They can get induction only on rubber, depending on the formulation and on the conductivity that the material has in the tire structure.

Third condition: In certain cases, where there are difficulties for induction (in a punctual or general manner) which can be attenuated or compensated partially or fully in the tire perimeter with application of the envelope with extremely conductive materials enveloping the tire and delivering conduction on entire surface of the tire, both internally and externally, because certain types of envelopes cover all the tire areas and only require a few changes in formulations.

Fourth condition: in cases where localized heating is necessary in a specific area of the structure that needs higher temperature conduction, localized application of rubber profiles with conductive properties is feasible. This leads to quicker heating of the desired place.

In the induction vulcanization process, heat is generated directly in the tire casing, and does not need autoclave body heating, which has a great heating and heat conduction surface. Heat is limited to the inner plies and the material applied. There is no need for conduction along the thickness of the new material, heat is generated practically in the centre of the structure and conducted from the inside out, so key areas that are near the casing structure are vulcanized. They get more intense heat for longer and this leads to extremely quick, safe, clean vulcanization with less heat transfer to the environment.

On the logics of the stage of autoclave vulcanization with induction heating system: when a metal part is placed inside an inductive coil fed by alternate current, the two parts are interconnected by an alternate electromagnetic field. This way the magnetic field which is absorbed by the part is transformed into electric field, which generates the induced current that will heat the part.

The density of the induced current on the surface of the part is increased and it reduces as the distance is increased in relation to the surface. This phenomenon is known as skin effect. The depth of penetration is of extreme importance for inductive heating engineering, because it is via the penetration depth that approximately 90% of the total energy in induced in the part or area to be heated.

The value of penetration depth (d) depends on the resistivity of the material [r (in ohm meter)] and on the relative permeability (m r) and on the frequency o the heating current [f (in Hertz—hz).

For a part in the shape of a tire, inductive heating is limited to surface layers, and the tire core should remain unchanged. This condition has advantages to preserve energy and reduced distortion to which the tire is exposed (which is found when compared to conventional systems in which the part undergoes prolonged total heating time).

Heat penetration in the areas to be vulcanized will be made by conduction. It only requires sufficient time for heat to reach this area.

In practical terms, the optimal frequency is not always the choice with the top cost/benefit ratio. The choice of power operation is influenced by other factors such as the extension of the range of cross sections to be heated and the rate that they represent in the total volume produced.

There are several advantages added with the tire autoclave vulcanization system with induction heating.

Firstly, relating to the quality of retreaded tires, it prevents oxidation of the metal surface thanks to the reduced heating time (1-10 seconds). The heating is uniform and reproducible. The crystallographic structure of steel remains unchanged, even in forging and lamination processes at extremely high temperatures. As a consequence, tires do not deform because forces produced on the surface do not change the shape of the core, which remains cold.

Second, relating to vulcanization of retreaded tires, allows control of time and heating temperature. It is possible to apply heat in a punctual manner, with great accuracy in those areas that must be vulcanized; energy transfer per surface unit, taking 450 khz as reference; heat is generated by induction on the part itself. In case of steel, it is approximately 10 times as high as heat generated in a gas oven; reduced physical space in the heat generation areas; there is no heating by convection, radiation or flame with high values of power transfer as induction heating; comparing heating by electric resistances to inductive heating, we can transfer by induction up to 4,000 times as much power per cm2(w/cm2), with induction in the range of 1,000-3,000 W/cm$^2$; energy savings because the process generates and conducts by the inner part of tires, very close to the liking point between the two materials that must be vulcanized. There is no need for a boiler, electric resistance or other sources of heat. This provides great savings as to cleanliness, management, equipment and personnel maintenance; high productivity, since the rubber thickness does not produce great differences in vulcanization times of tires of different sizes, which makes it possible to vulcanize a wide range of tires of different applications in one same process cycle.

As a consequence of the previous item, we get significant reduction in vulcanization time, time of use of compressors and boilers; the autoclave does not need to absorb and homogenize the heated mass so it is no longer a heat and power consuming source; less aggression to the casing structure and consequent re-use since the tire is heated for less time to get vulcanization; process has no pre-heating stage because the system works with induction, not convection, which does not make induction difficult of parts that require vulcanization; losses in induction process are small since the envelope of metal plies is a rubber structure that resists heat. As vulcanization is required in the inner part of the casing, i.e., in the base of the pre-molded, in repairs made to the casing plies, and in patches applied inside plies of radial tires, we conclude that the heat applied is in its optimal point of transmission, and ecologically sustainable process because it is not aggressive to nature, it preserves materials, it irradiates less heat to the work environment, it is not pollutant and it does nor burn materials.

DETAILED DESCRIPTION OF THE INVENTION

Figure 1:
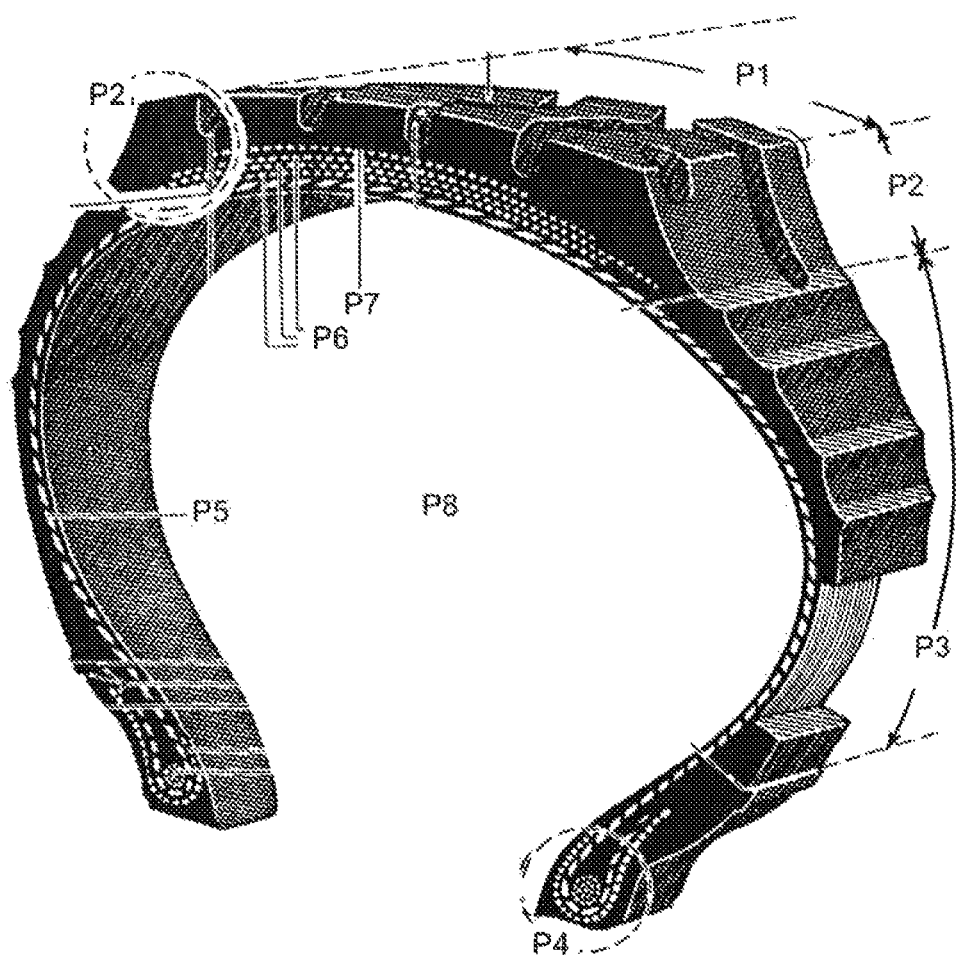
FIG. 1 is a representation in perspective of a tire structure to show its key component parts—prior art.
Figure 2:
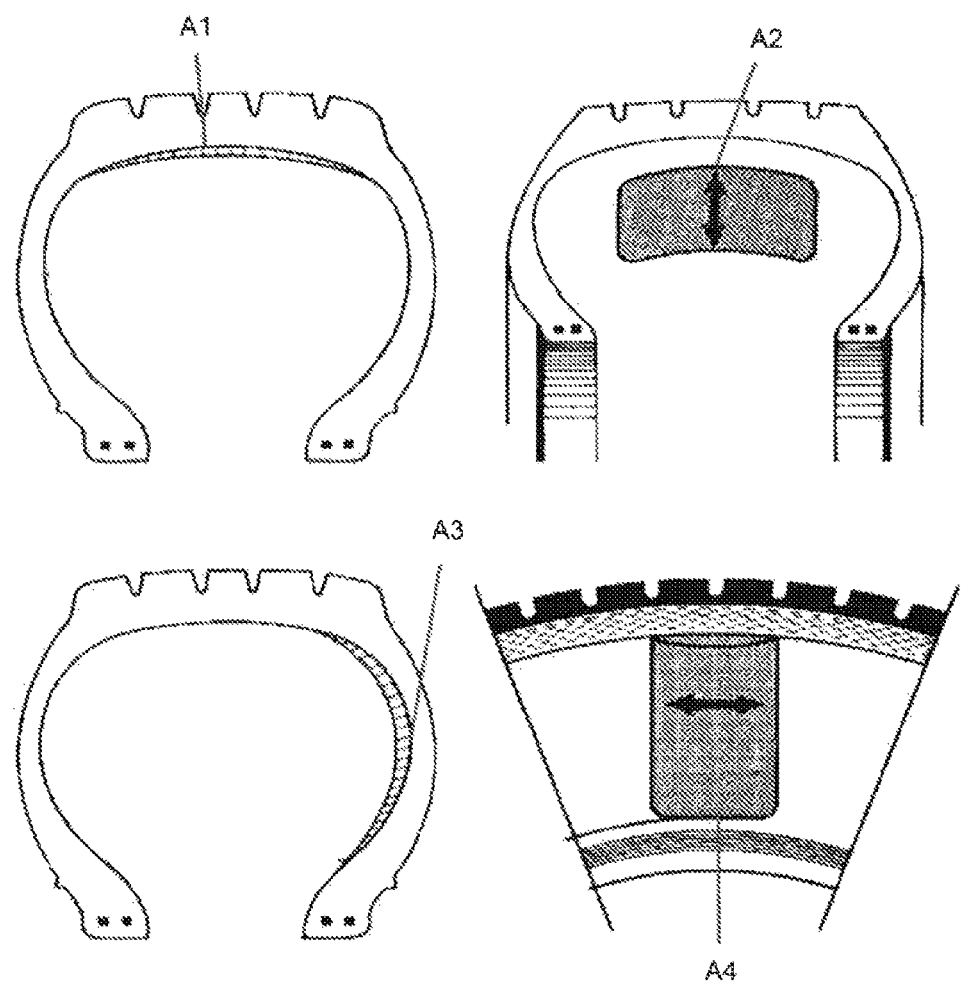
FIG. 2 is a crosscut to show the tire areas that can be vulcanized—prior art.
Figure 3:
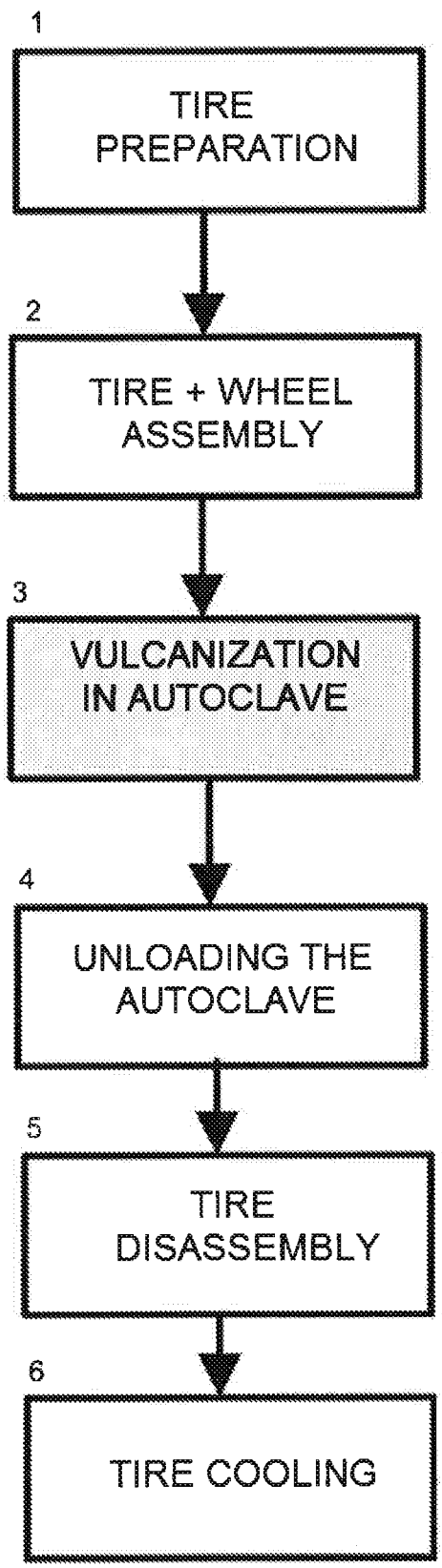
FIG. 3 is a block diagram showing the flow of vulcanization steps. The last stage refers to provision of heating system by autoclave induction.

The following detailed description must be read and interpreted with reference to the drawings and block diagrams. They are diagrammatic, and represent the preferred form of performance of the tire vulcanization stage with induction heating system. It is not designed to limit the scope of the invention. The invention is limited to the explanation in the claims.

On the basic parameters of the autoclave vulcanization process with induction heating system: to get successful tire vulcanization, the basic variables involved in the process are pressure, temperature and time.

1. Pressure Parameter:

1.1 For a single pressure system, the pressure is defined in the 2-6 kg/cm2 range.

1.2 For a double pressure system, a process in the 4-7 kg/cm2 range is the autoclave, in the air bag, a pressure in the 6-9 Kg/cm2 range, and a differential pressure between the air bag and the autoclave in the range of 1.5-3 Kg/cm2 greater than the air bag;

1.3 For a triple pressure system, a pressure in the 4-7 kg/cm2 range in the autoclave, in the air bag, a pressure in the 6-9 Kg/cm2 range and in the envelope a pressure in the 5-8 kg/cm2 range, where the differential pressure between the air bag and the autoclave is in the 1.5-2.5 Kg/cm2 range, greater in the air bag, and differential pressure between the envelope and the autoclave in the 0.7-1.5 Kg/cm2 range.

2. Vulcanization time parameter: This varies depending on the material formulations, material conductivity and thickness of the tire components. This rule defines if induction will be applied directly or indirectly, usually via heating conduction. It must be pointed out that, regardless of the formulation, vulcanization time of materials varies in the range of 5-30 minutes/millimeter applied of thickness, considering the positions of the heat generation sources on the casing structure.

3. Vulcanization temperature parameter: normally the temperature applied is in the 75-150° C. range for most materials: linking rubber in general, tread compounds, laminated rubber, anti-fatigue compounds.

For reasons of quality, for passenger car tires, mini-trucks and cargo load vehicles, it is recommended to apply temperatures around 100° C. (75° C.-110° C.). The practical result is better preservation of rubber quality.

Finally, for applications where the speed variable is low, as for earthwork and agricultural machines and industrial machines, it is recommendable to apply temperatures in the 130-150° C. range without too many risks or implications to quality.

Rubber de-vulcanization process: By using the same means of application of induction, we can revert the vulcanization process particularly with the purpose of reverting the structural chain formed by plies and by the volume around their structure so that vulcanization reaches both fully and partially the link of rubber with the ply to facilitate extraction of great layers of rubber to recycle the material, particularly radial tires which have a complex chain of steel wire combined with rubber, which makes it very difficult to extract the material.

The process itself is quite simple in comparison to the previous process. All one needs to do is to set the temperature adjustment usually above 200° C. up to 400° C. and apply a time coefficient for over-cure and the desired results can easily be obtained.

Tires are loaded in the autoclave with no need for any type of assembly. At most, product lines as similar as possible should be arranged to get standardization of time and temperature.

Guidelines for specification of the assembly of autoclave provided with induction system: to assemble an autoclave induction system, it is critical to determine the following parameters: conductivity of materials applied and assembled to help in the vulcanization; conductivity of the tire structural components; suitable induction systems and induction positioning.

1. Conductivity of the materials applied:

There are two types of tire construction, radial tires, usually including metal plies and diagonal tires, usually with textile plies such as nylon, polyester or rayon.

As conductivity of materials is different, when diagonal tires have problems with induction, qualifications of the material to be applied must be taken in consideration to get the conductivity required for heating, which will take place indirectly via the materials applied of the envelope and of the conductive inner coating internally assembled in the tire. Because of its constructive characteristics it suffers deformation with the heat. For this reason, usually the induction devices can only operate outside the tire, considering that it is necessary to vulcanize the assembled tire. In this case, induction will be applied indirectly by conduction of assembly materials and accessories and also in specific parts of the tire to facilitate application of induction.

2. Tire structural components: The structure of radial tires usually includes steel wires in the entire extension. This greatly facilitates the inductive process because the tire structure does not deform easily due to heat. For this reason, one can use the envelope system with sealing rims or "innerlop" with rubber sealing, and the inner side is free. This facilitates positioning induction inside the tire, as an option for installation. In this case, induction will be applied on the casing structure. As it is made of metal components, the process becomes easier and more economic in autoclave manufacturing.

3. Suitable induction systems: An induction system basically comprises a power source of the most variable models depending on the power and frequency required by the inductor, which will be conformed per tire size specifications, and accessories, such as field concentrator. When assessing conductivity of materials and structural components of the tire, it is necessary to determine the suitable frequencies of induction that will be applied. This varies directly in function of the formulations of materials such as rubber which may get several conductive components and at several concentrations. This will affect the choice of suitable power sources for heating as well as the inductor and sometimes the field concentrator.

In practical terms, the optimal frequency not always represents the choice with the best cost/benefit ratio, considering that other factors such as the extension of the range an several cross sections to be heated, the proportion in the total volume produced, the temperature which is lower in the case of rubber in comparison to use in metal components.

4. Induction positioning: the methods of application of induction can be rated as:

4.1 Stationary: when only the pre-defined spot is heated.

4.2 Turning: the component of the circular section turns at an empirically set speed while heating takes place.

4.3 Progressive: method oriented to treatment of large items. Several inductors are assembled in different points and the tire is turned at the same time that the inductor is displaced.

Figure 5:
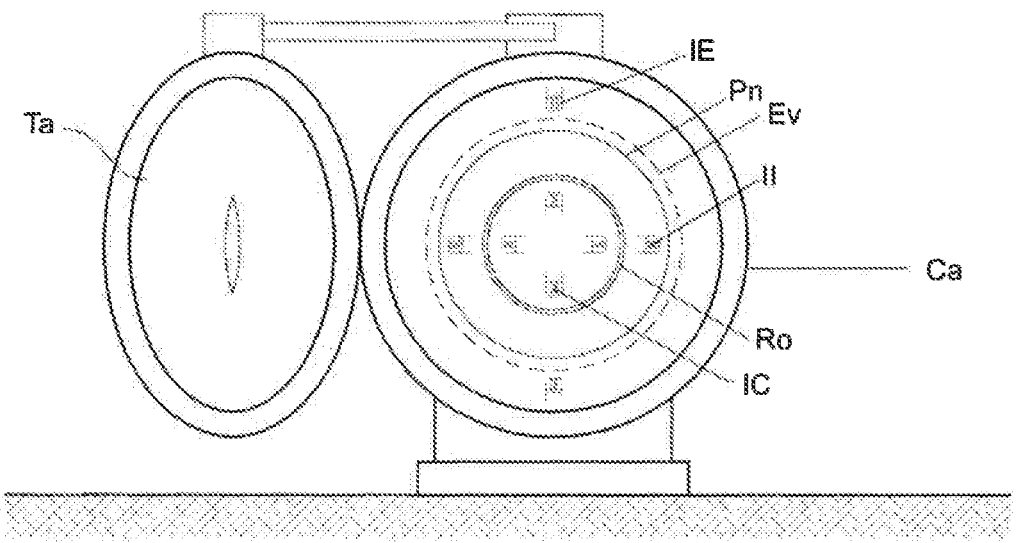
FIG. 5 is a front view of an autoclave loaded with tires to show the basic technical construction of the induction heating system.
Figure 6:
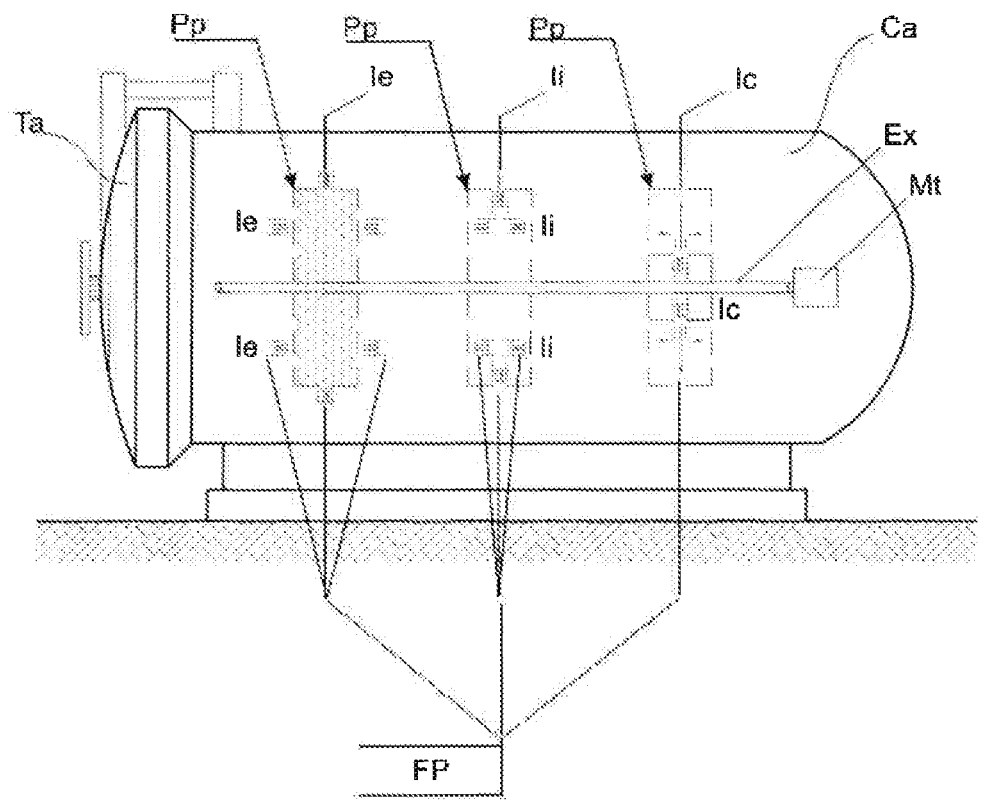
FIG. 6 is a crosscut of an autoclave loaded with tires to show the basic construction of the induction heating system.

Position to apply inductors: as shown in FIGS. 5 and 6, external inductors (Ie) are considered. They are located outside the tire (Pn) and form a continuous ring in the radial direction of the tire (Pn) encompassing both beads (Tl); internal inductors (Ii), located in the inner areas of the tire (Pn), center inductors (Ic) located in the bead (Tl) areas of the tire (Pn).

Figure 4:
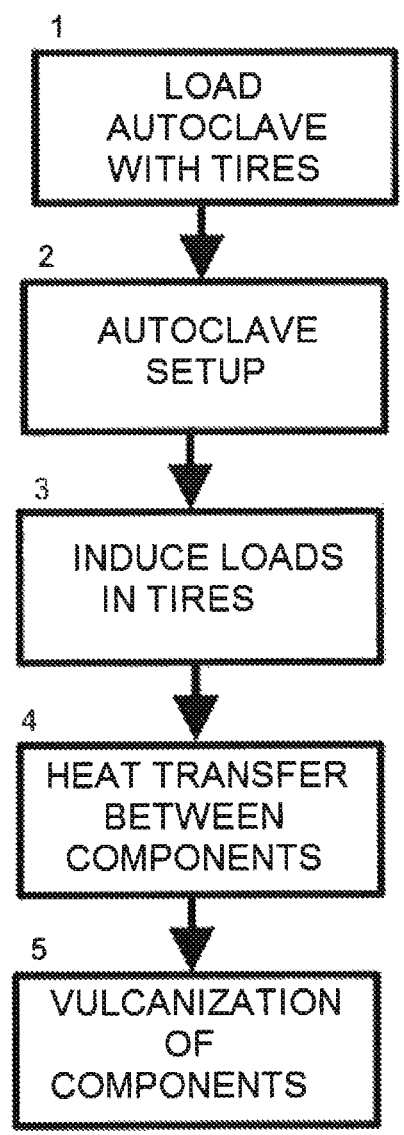
FIG. 4 is a block diagram to show the flow or the tire vulcanization stage with autoclave induction heating.

On the autoclave vulcanization process with induction heating system: illustrated by block diagram in FIG. 4. It includes the following steps:

autoclave loading (1): the autoclave is shown in FIGS. 5 and 6. Its construction is based on a housing (Ca) with an access lid (Ta). Inside there is a center axle (Ex) with rotation given by the (Mt), where prepared tires (Pp) are duly loaded. The structure of prepared tires (Pp) is given by the tire (Pn) to which a wheel (Ro) is assembled in the center. The periphery is coated by the envelope (EP). Inductive components are assembled, particularly outer inductive components (Ie), inner inductors (In) and center inductors (Ic), connected to a power source (FP). These will work on the prepared tire (Pp) in conformance with parameters of:
  a. conductivity of the materials applied and assembled to help in the vulcanization process;
  b. conductivity of tire structural components;
  c. suitable induction systems; and
  d. induction positioning.

In this stage we can see gains with a quicker loading cycle;

autoclave setup (2): the autoclave operator sets the pressure, temperature and vulcanization time parameters;

load induction in components_(3): the tire (Pn) inductive components get the action of the inductive load, which can occur in the following way: external inductors, located in the outer areas of the prepared tire (Pp), forming a continuous ring in the radial direction of the tire (Pn) encompassing both beads (Tl); internal inductors (Ii), located n the internal areas of the prepared tire (Pp), and center inductors (Ic) located in the bead areas (Tl) of the prepared tire (Pp).

This stage causes significant reduction in energy consumption;

Heat transfer between components_(3): heat is transferred between components of the tire (Pn) which undergo induction. This stage is characterized by less fatigue among components during the induction process;

Vulcanization of components (4): The tire (Pn) components are vulcanized and undergo the effects of induction. This stage is characterized by reduced vulcanization time. At the end of the stage, the tire (Pn) becomes heated, but at a lower temperature than that seen in vulcanization by heat conduction; and Tire cooling off (5): takes place by conduction and convection. This stage is characterized by delivering tire finishing in a shorter time.

The way to carry out the procedure as described in this constructive detailing is given only as an example. Alterations, modifications and variations may be made for other forms of particular constructions by experts but without diverging from the purposed stated in this patent application, which is exclusively defined by the claims.

The invention claimed is:

1. A process for vulcanizing a prepared tire having metal plies and inner and outer rubber components, having a thin layer of crude rubber applied to a carcass, cured within an autoclave with the use of electromagnetic induction to heat straight into an inner metal components of tire plies, specifically applied to retreaded tires; the process comprising the following steps:
   (1) choosing predetermined suitable inductors according to the characteristics of the prepared tire;
   (2) fixing the inductors inside the autoclave which is provided with a motor rotated center axle;
   (3) pitching the suitable frequency and intensity of the inductors according to the kind of crude rubber applied; the crude rubber differing in the tire is either for high or low speed, for a heavy or light truck, for an earthmover or agricultural vehicle;
   (4) setting up the autoclave by determining the suitable pressure, time and temperature to begin vulcanization process; the process controlled by a power module that delivers the amount of electromagnetic induction necessary to vulcanize the different kinds of materials applied;
   (5) directly inducing an electromagnetic field on the metal inner ply of the tire, the frequency and intensity of induction causing metal molecules to vibrate thus generating heat on the metal inner ply;
   (6) the heat generated dissipates through the tire rubber components causing the thin layer of crude rubber applied to the carcass to vulcanize due to its proximity to the ply structure; and
   (7) vulcanizing all inner and outer components subjected to the heat, ending the retreading process.

2. The process according to claim 1, wherein the characteristics of the prepared tire provided are speed, load capacity, dimension and physical-chemical characteristics of the materials.

3. The process according to claim 1, wherein the inductors are selected from the group consisting of: external inductors (Ie) located in the outer area of the prepared tire, internal inductors (In) located in the inner area of the prepared tire, center inductors (Ic) located in the bead areas (Tl) of the prepared tire; and combinations thereof.

4. The process according to claim 1, wherein the inductors have induction modes selected from the group consisting of: stationary, rotating and progressive.

5. The process according to claim 1, wherein the frequency is pitched up to 450 khz.

6. The process according to claim 1, wherein the frequency and induction intensity entail temperatures ranging from 75° C. to 150° C. depending on the materials applied, type, dimension, conditions of use and specific features required by the tire.

7. The process according to claim 6, wherein the temperature ranges from 75° C. to 110° C. on tires for vehicles with high speed variability.

8. The process according to claim 7, wherein the vehicles are automobiles, pick-ups and trucks.

9. The process according to claim 6, wherein the temperature ranges from 130° C. to 150° C. on tires for vehicles with low speed variability.

10. The process according to claim 1, wherein the inner ply structure is made of steel.

* * * * *